United States Patent
Chen et al.

(10) Patent No.: US 8,101,221 B2
(45) Date of Patent: Jan. 24, 2012

(54) METHODS FOR PRESERVING FRESH PRODUCE

(75) Inventors: Chao Chen, North Attleboro, MA (US); Xiaoling Dong, North Attleboro, MA (US); Kenneth James, Farnborough (GB)

(73) Assignee: Mantrose-Haeuser Co., Inc., Attleboro, MA (US)

( * ) Notice: Subject to any disclaimer, the term of this patent is extended or adjusted under 35 U.S.C. 154(b) by 2068 days.

(21) Appl. No.: 10/920,799

(22) Filed: Aug. 18, 2004

(65) Prior Publication Data

US 2005/0084602 A1    Apr. 21, 2005

Related U.S. Application Data

(60) Provisional application No. 60/498,399, filed on Aug. 28, 2003, provisional application No. 60/523,517, filed on Nov. 19, 2003, now abandoned.

(51) Int. Cl.
*A23L 3/34* (2006.01)

(52) U.S. Cl. .................. 426/321; 426/74; 426/320

(58) Field of Classification Search .............. 426/615, 426/74, 320, 321, 72
See application file for complete search history.

(56) References Cited

U.S. PATENT DOCUMENTS

| | | |
|---|---|---|
| 772,062 A | 4/1957 | Malecki |
| 2,791,508 A | 5/1957 | Rivoche |
| 2,894,843 A * | 7/1959 | Malecki ............ 426/267 |
| 5,955,004 A | 9/1999 | Moreno |

FOREIGN PATENT DOCUMENTS

| | | |
|---|---|---|
| EP | 141875 | 5/1985 |
| EP | 0 316 293 A1 | 5/1989 |
| EP | 1 153 901 A2 | 11/2001 |
| FR | 1.088.365 | 3/1955 |
| JP | 62-262945 | 11/1987 |
| JP | 6-181684 | 7/1994 |
| JP | 2003-47399 | 2/2003 |
| WO | 00/30460 | 6/2000 |
| WO | WO 01/67878 | 9/2001 |

OTHER PUBLICATIONS

International Search Report dated Dec. 12, 2004.
European Search Report from related EP application No. 04782189.7-1221, mailed Apr. 2, 2007, 5 pages.
Chen, PM et al., "Developing a Value-added Fresh-cut 'D'Anjou' Pear Product", Hortechnology, Apr.-Jun. 2003, 13(2), pp. 314-320.

* cited by examiner

*Primary Examiner* — Helen F Heggestad
(74) *Attorney, Agent, or Firm* — Calfee, Halter & Griswold LLP

(57) ABSTRACT

Methods of preserving fresh produce with a produce preservative which extends the shelf life of fresh produce, particularly cut fresh produce, and preserves the texture, flavor, appearance, crispness, and color of the fresh produce, particularly the exposed surface of the fresh produce, are provided. The method comprises: providing a solution of produce preservative comprising: water; a preservative cation which is selected from the group consisting of a strontium ion, lithium ion, barium ion, aluminum ion, copper ion, ammonium ion, iron ion, manganese ion, potassium ion, or mixtures thereof; and ascorbate ions, or erythorbate ions; wherein the ascorbate ions or erythorbate ions and the preservative cation are present in an ion ratio of preferably from 0.2:1 to 8:1, more preferably 0.75:1 to 8:1, even more preferably from 1:1 to 4:1, yet more preferably 1.5:1 to 3:1; most preferably 1.1:1 to 2.5:1; and, applying said produce preservative to the produce. The invention also relates to fresh produce preserved with the produce preservatives.

12 Claims, No Drawings

METHODS FOR PRESERVING FRESH PRODUCE

CROSS REFERENCE TO RELATED APPLICATIONS

This application claims the benefit of the filing date of U.S. Provisional Application No. 60/498,399, filed Aug. 28, 2003, and U.S. Provisional Application No. 60/523,517 filed Nov. 19, 2003 which are incorporated herein by reference in their entirety.

BACKGROUND OF THE INVENTION

Fresh produce rapidly deteriorates particularly when the flesh of the fruit or vegetable is exposed, such as by peeling the or by slicing the produce. The appearance, flavor, texture, and crispness rapidly degrades. Within hours, produce, such as apples, begin to turn brown and lose their distinctive flavor. The produce loses its texture and firmness; the produce becomes soft and loses its characteristic crispness.

Many methods of preservation involve cooking, which changes flavor and texture; typically appearance is also changed. Freezing substantially preserves flavor; however, texture and crispness are affected. Furthermore, frozen foods need to be continually stored and require freezers for storage. Drying often preserves flavor, but texture, crispness and appearance are substantially affected. Refrigeration helps to preserve crispness, texture and flavor for a limited number of hours, but does not prevent discoloring. Chemical preservatives are often used alone or in conjunction with these methods of preserving; however, they typically leave a residual taste.

One method employs four active ingredients: an acidulant such as citric acid; a metal sequesterant or chelant, such as sodium acid polyphosphate; an enzyme inhibitor such as sodium chloride; and an antioxidant such as ascorbic acid. However, the fruit has an unpleasant taste and the produce typically turns discolors within 5 days.

Citric acid, which is present in lemon juice, has been used to delay discoloring in fruits; however, the fruit tastes sour, becomes soft and soggy, and typically the fruit discolors within hours.

Sodium ascorbate has also been used to preserve fruit; while the color degradation is delayed, the fruit has a noticeable salty taste.

Other methods often involve forming a film on the surface of the fruit; however such films often leave an unacceptable gummy feel when eaten.

It would be desirable to have a method for preserving produce, particularly cut produce, which preserves the appearance, color, texture crispness and flavor, yet does not leave an after taste nor require cooking, drying or freezing.

SUMMARY OF THE INVENTION

The present invention pertains to methods of preserving fresh produce with a produce preservative which extends the shelf life of fresh produce, particularly cut fresh produce. The produce preservative preserves the texture, flavor, appearance, crispness, and color of the fresh produce, particularly the exposed surface of the fresh produce. The method comprises the following steps: providing a solution of produce preservative comprising: water; a preservative cation which is selected from the group consisting of a strontium ion, lithium ion, barium ion, aluminum ion, copper ion, ammonium ion, iron ion, manganese ion, potassium ion, or mixtures thereof; and ascorbate ions, or erythorbate ions; wherein the ascorbate ions or erythorbate ions and the preservative cation are present in an ion ratio of preferably from 0.2:1 to 8:1, more preferably 0.75:1 to 8:1, even more preferably from 1:1 to 4:1, 1.5:1 to 3:1; most preferably 1.1:1 to 2.5:1; and, applying said produce preservative to the yet more preferably produce.

The produce preservative solution contains preferably from 0.02% to a saturated solution, more preferably from 0.02% to 30%, even more preferably from 0.05 to 20%, even more preferably from 0.2% to 10%, yet more preferably from 0.5% to 8%, most preferably from 0.6% to 5%, by weight, preservative cation; and preferably from 0% to 40%, more preferably from 0.1% to 40%, even more preferably from 0.1% to 30%, yet more preferably from 0.5% to 15%, most preferably from 1.0% to 5%, by weight, ascorbic acid or the stereo isomer of ascorbic acid, erythorbic acid.

Preferably the produce is then stored at a temperature which will not freeze the produce; preferably the produce is stored at temperatures of between −6 to room temperature. The invention also relates to fresh produce preserved with the produce preservatives.

DETAILED DESCRIPTION OF THE INVENTION

The present invention pertains to methods of preserving fresh produce, that is, uncooked fruit and vegetables with a fresh produce preservative which extends the shelf life of the fresh produce, particularly cut fresh produce. The produce preservative preserves the texture, flavor, appearance, crispness, color of the fruits, particularly tree fruits, such as for example, avocado and pome fruits such as apples and pears. The preservative also preserves the texture, flavor, appearance, crispness, color of vegetables, particularly the following vegetable families: the Solcanaceae family, for example, potatoes, peppers, eggplants and tomatoes; the Alliaceae family, such as onions; and the Brassiaceae family also referred to as the Cruciferae family, for example cabbage; the Cucurbitaceae family, for example, cucumbers; the Apiaceae family also referred to as the Umbelliferae family, for example celery; and the Compositae family, also referred to as the Asteraceae family, for example, lettuce. The produce preservative also preserves edible fungi of the Ascomycetes/Basidiomycetes classes, such as edible mushrooms. Unless otherwise noted, the term "vegetable" shall include the edible fungi in addition to the conventional vegetables.

The method comprises the following steps: providing a solution of produce preservative comprising: water; preservative cation which is either a strontium ion, lithium ion, barium ion, aluminum ion, copper ion, ammonium ion, iron ion, manganese ion, potassium ion or mixtures thereof; and ascorbate ions or erythorbate ions, wherein the ascorbate ion or erythorbate ion, and the preservative cations are present in an ion ratio of 0.2:1 to 8:1, more preferably from 0.5:1 to 4:1, more preferably from 1.5:1 to 2.5:1; and, applying such produce preservative to the produce. Copper ions are less preferred. The produce preservative is applied using conventional techniques preferably for a time sufficient to coat the produce with the produce preservative. Suitable techniques are spraying, sprinkling and dipping. Preferably the produce is then stored at a temperature which will not freeze the produce; temperatures of −6° C. have been found not to freeze the apples. Preferably the produce is stored at temperatures of between −7 to room temperature, 20° C., more preferably −2 to 7° C., most preferably form 2 to 5° C. Fresh produce preserved with produce preservative which is stored at room temperature will maintain color, flavor, texture and taste, however after extend The method inhibits freshly cut produce from discoloring; the length of time depends on the preservative cation selected for the produce preservative solution. Produce is typically prevented from discoloration for a week, in some cases, 2 weeks or more while maintaining the freshness, crispness, texture, color and flavor of the produce usually without any residual taste. The exact length of the period of preservation also depends upon the initial produce quality, the species and the variety of the produce and growing conditions of the produce. The method of the present invention offers the advantage in that the preserved produce may be stored under standard atmospheric pressure and standard atmospheric conditions; that is, the method does not require that the produce be stored under vacuum or inert atmosphere. The method of preserving produce does not require that the food be cooked, dried or frozen. The method offers the advantage in that it does not require preservatives such as sulfites. However, after the produce is preserved with the produce preservative, it may be dried or freeze-dried for use such as, for example, food or potpourri; the produce preservative will further delay the discoloration that eventually occurs in dried and freeze dried produces. In the event that such dried or freeze dried produce is reconstituted, the produce will be less discolored than had the produce not been preserved with the produce preservative.

The Produce Preservative

The produce preservative is preferably a solution which contains: water; a preservative cation;

The source of the preservative cation is a preservative cation-hydroxide or a salt of a preservative cation or mixtures thereof. Salts of preservative cations are, for example, ascorbates, erythorbates, chlorides, carbonates, phosphates, oxides, glycerophosphates, and mixtures thereof. Lactates an The source of the ascorbate ion is ascorbic acid, erythorbic acid, or an ascorbate or erythorbate salt. Preferably an ascorbate or erythorbate salt is used as the source for both the preservative cation and the ascorbate or erythorbate ion.

When added to water the ascorbic acid disassociates at least partially into an ascorbate ion and a hydrogen ion. Similarly, the salt of a preservative cation disassociates into the preservative cation and the corresponding anion. For example, the lithium salt lithium carbonate disassociates into the lithium ion and the corresponding carbonate anion. Where the compound containing the preservative cation and ascorbate or erythorbate, for example, lithium ascorbate, or lithium erythorbate, is employed, the produce preservative may also be used in the dry form. In the dry form, the produce preservative is preferably powdered or granular. Preferably, the dry form preservative contains at least 1%, more preferably at least 2%, even more preferably at least 4% most preferably at least 5% of the produce preservative.

The percentage of the dry ingredients, exclusive of water, in the produce preservative are preferably: from 1% to 100%, more preferably from 12% to 50%, even more preferably from 20% to 40%, most preferably from 15% to 35% of a preservative salt; where the preservative salt is a salt other than an ascorbate or erythorbate salt, there is preferably from 0.5% to 95%, more preferably 50% to 85%, more preferably from 60% to 88%, most preferably from 65% to 75% ascorbic acid. Where the salt is an ascorbate or erythorbate salt, ascorbic acid is not necessary and is not preferred. The preservative salt is a salt containing a preservative cation.

Where the preservative salt is a chloride, the percentage of the dry ingredients, exclusive of water, in the produce preservative is preferably from 30% to 95%, more preferably from 60% to 80%, most preferably from 63% to 67%, ascorbic acid or erythorbic acid, and from 5% to 70%, more preferably from 20% to 35%, most preferably from 25% to 30%, preservative salt.

Where the preservative cation source is a hydroxide, the percentage of dry ingredients in the produce preservative is preferably from 50% to 95%, more preferably from 60% to 92%, most preferably from 70% to 85%, ascorbic acid, and from 5% to 50%, more preferably from 8% to 40%, most preferably from 15% to 30%, hydroxide.

Where the preservative salt is a carbonate, the percentage of dry ingredients in the produce preservative is preferably from 50% to 95%, more preferably from 55% to 90%, most preferably from 60% to 85%, ascorbic acid or erythorbic acid and from 5% to 50%, more preferably from 10% to 45%, most preferably from 15% to 40%, preservative salt.

The produce preservative solution contains preferably from 0.075% to a saturated solution, more preferably from 0.225% to 12.25%, even more preferably from 0.375% to 6%, preservative cation salt; and preferably from 0.2% to 30%, more preferably from 1.0% to 8.5%, more preferably from 2% to 5%, ascorbic acid or the stereo isomer of ascorbic acid, erythorbic acid.

The produce preservative solution preferably has an ion or mole ratio of ascorbate ion or erythorbate ion, to preservative cation, of from 0.2:1 to 8:1, more preferably 0.75:1 to 8:1, even more preferably from 1:1 to 4:1, yet more preferably 1.5:1 to 3:1; most preferably 1.1:1 to 2.5:1; and, applying said produce preservative to the produce.

The preferred embodiment of the produce preservative solution has from 0.5% to saturated solution, preferably 1.5% to 15%, more preferably from 2.5% to 10% of a preservative cation-ascorbate.

The pH range of the produce preservative solution is preferably from 1.7 to 10, more preferably from 2 to 8, most preferably from 3 to 7.5. The pH is adjusted if needed with conventional reagents such as for example, conventional acids such as hydrochloric acid, or conventional base such as sodium hydroxide.

For the best taste, the produce preservative preferably does not have a chloride concentration greater than 35%, even more preferably not greater than 0.15%, yet preferably not greater than 0.1%; most preferably not greater than 0.01% by weight, of the dry ingredients. Similarly, for the best taste, the produce preservative preferably does not have a sodium concentration greater than 5%; more preferably not greater than 1%; even more preferably not greater than 0.5%, yet preferably not greater than 0.1%, most preferably not greater than 0.01%, by weight, of the dry ingredients.

Preferably the produce preservative does not have a concentration of citric acid, citrate ion, acetic acid, acetate ion, lactic acid, lactate ion, malic acid, malate ion, or the salts of such acids, or other acids or acid ions, (with the exception of ascorbic acid, ascorbate ion and erythorbic acid, erythorbate ion), greater than 20%, more preferably not greater than 10%, even more preferably not greater than 5%, even more preferably not greater than 1%, yet more preferably not greater than 0.1%; most preferably not greater than 0.01% by weight, of the dry ingredients. If citric acid or citrate is employed, it is preferred that there is more ascorbic acid than citric acid and/or it is preferred that there is more ascorbate than citrate.

Again, for best taste, the produce preservative does not have a metal ion sequestrant, particularly an acidic polyphosphate metal ion sequestrant or chelant concentration greater than 5%, more preferably not greater than 2%, even more preferably not greater than 0.5%, yet more preferably not greater than 0.1%; most preferably not greater than 0.01%, by weight, of the dry ingredients.

Preferably the produce preservative does not have a sulphite concentration greater than 5%, more preferably not greater than 2%, even more preferably not greater than 0.5%, yet more preferably not greater than 0.1%; most preferably not greater than 0.01% by weight, of the dry ingredients. Sulphites include for example sodium metabisulphate, potassium metabisulphite, sodium bisulphite, sodium disulphite, and calcium bisulphite.

The produce preservative preferably does not have a flavonoid, rose hips, or pineapple juice, concentration greater than 5%, more preferably not greater than 2%, even more preferably not greater than 0.5%, yet more preferably not greater than 0.1%; most preferably not greater than 0.01%, by weight, of the dry ingredients.

The produce preservative preferably does not have a tocopherol, particularly alpha tocopherol, concentration greater than 5%, more preferably not greater than 2%, even more preferably not greater than 0.5%, yet more preferably not greater than 0.1%; most preferably not greater than 0.01%, by weight, of the dry ingredients.

It is also preferred that the produce preservative lacks agents which affect the "mouth feel" of the cut vegetable and impart a waxy or slippery feel to the vegetable, such as gelling agents, film forming agents, waxes, gums, polysaccharides, such as hydroxymethyl cellulose, methyl cellulose, microcrystalline cellulose, alginates, carrageenans, lipids, pectins, modified starches, locust bean gum, xanthum gum, gellan gum, guar gum, and tragacaths. The preservative solution preferably does not have a concentration of such an agent greater than 5%, more preferably not greater than 2%, even more preferably not greater than 0.5%, yet more preferably not greater than 0.1%; most preferably not greater than 0.01% by weight, of the dry ingredients.

It is also preferred that the produce preservative does not have a lecithin, emulsifier, protein, or individual amino acids, such as cysteine, more specifically L-cysteine, concentration greater than 5%, more preferably not greater than 2%, even more preferably not greater than 0.5%, yet more preferably not greater than 0.1%; most preferably not greater than 0.01%, by weight, of the dry ingredients.

While certain cations, for example strontium and barium may not suitable for preserving produce that is to be eaten, they are useful for preserving produce used in potpourris and crafts, particularly where such produce is dried.

Methods of Preserving Produce with the Produce Preservative

The fresh produce is preferably first sanitized to reduce or eliminate microorganisms on the surface of the skin. Good results have been obtained using a sodium hypochlorite solution containing 50-100 ppm available chlorine. The produce is then processed such as for example, by paring, slicing, coring, dicing, peeling or a combination thereof; preferably sanitized or washed again, and then the produce preservative is applied. The produce preservative is applied, preferably at ambient temperature, by conventional techniques such as spraying, dipping, sprinkling, tossing, immersing or drenching. Dipping involves immersing the produce into a solution of produce preservative and is generally preferred. Good results have been obtained by dipping produce 1-2 minutes. Longer dipping times are also employed; dipping times over 15 minutes might effect flavor.

The produce is then preferably placed in packaging to prevent or reduce drying of the produce, particularly if it is not to be consumed within several hours, such as where the produce is to be transported or displayed on a shelf. However, where the produce is to be consumed within several hours from slicing or peeling, it is preferably not packaged. Suitable packaging includes for example, 2-4 mil polyethylene bags, polystyrene "clam shell" packages, multi-layer polyolefin bags such as Food Saver bags Cryovac PD900, or Cryovac B900, bag from Cryovac Inc., containers having a polyethylene bag, without a seal, in a cardboard box.

Preferably the produce is stored at a temperature which will not freeze the produce; for example, temperatures of −6° C. have been found not to freeze the apples. Preferably the fresh produce is preferably stored at below 30° C., more preferably below 25° C., even more preferably below 10° C., even more preferably below 5° C., to reduce microbial growth. While the produce may be stored at ambient temperatures around 20° C., shelf life is increased by storing below 20° C., preferably below 10° C. The produce is preferably stored above 0° C. Preferably the produce is stored at temperatures of between −7 to room temperature, that is 20° C., more preferably −2 to 7° C., most preferably from 2° to 5° C.

Evaluation of Preserved Produce

As a result of being preserved with produce preservative, the degradation of the color of the produce is substantially reduced.

The firmness or hardness of the fruit is the force required for a probe to penetrate the fruit a given distance into the fruit. The firmness is determined using a Quality and Test System 25 and TA 40 probe from Stevens Company. The TA 40 probe a black acetate, 4.5 mm diameter, 20 mm long rod probe having a flat end. The following settings were employed in the QTS system: the test type is a compression test of one cycle, 0 second hold time, 0 second recovery, 5 g trigger point, 30 mm/min test speed, target unit distance, and a target value of 3 mm. The apple pieces were 1 cm thick.

The texture, flavor, and moistness of the fruit were evaluated by tasting fruit samples. The color and/or appearance was also evaluated by visual inspection. The color, texture, moistness and flavor were then evaluated according to a scale of either 1 to 10, with 10 being the value assigned to a freshly cut piece of comparative fruit or vegetable. A value of less than 7 is not acceptable.

The firmness of the produce in Example 11a were evaluated by bending produce samples. Appearance was evaluated by visual inspection. The moisture was evaluated by measuring the amount of water the produce released.

EXAMPLES

Example 1a

Whole Red Delicious apples were rinsed with tap water, sanitized with a sodium hypochlorite solution containing 100 ppm chlorine, then cored and sliced. The apple slices were immersed in water for 0.5 to 2 minutes. Then the apple slices were dipped into produce preservative solution containing 4% ascorbic acid and 1.59% $K_2CO_3$ having a pH 5.69 for 1 minute. The slices were removed from the solution and drained for 1-2 minutes, sealed in polyethylene bags, and stored at 2-5° C. For controls, sliced apples either not treated or were dipped into either 4% ascorbic acid with 0.66% NaOH to adjust the pH to 4.45. For comparison, sliced apples were dipped into a solution containing 4% ascorbic acid and 1.22% $Na_2CO_3$ and having a pH of 5.58.

The apples were evaluated and scored on a scale of 0-10 at time intervals. A score of 10 means that the fruit's color and appearance is as good as fresh cut fruit. A score of 7 is the minimum acceptable appearance. Hardness was measured with QTS25. The results are shown in Table 1.

TABLE 1

Evaluation of Sliced Apples
Preserved with Fresh Produce Preservative

| Example | Color | Flavor | Texture | Moistness | Hardness |
|---|---|---|---|---|---|
| 0 hour | | | | | |
| Untreated Control | 8.2 | 10 | 10 | 10 | 1898 |
| Ascorbic Acid Control | 10 | 5 | 10 | 10 | 2083 |
| Example 1a ascorbic Acid + $K_2CO_3$ | 10 | 9 | 10 | 10 | 1849 |
| Comparative Example | 10 | 7.4 | 10 | 10 | 2155 |
| 1 day | | | | | |
| Untreated Control | 6 | 9.8 | 9.2 | 10 | |
| Ascorbic Acid Control | 10 | 8 | 9.8 | 10 | |
| Example 1a Ascorbic Acid + $K_2CO_3$ | 10 | 9.5 | 10 | 10 | |
| Comparative Example | 10 | 8.6 | 10 | 10 | |
| 1 week | | | | | |
| Untreated Control | 4.4 | / | / | / | 1603 |
| Ascorbic Acid Control | 9.6 | 7 | 7.8 | 10 | 1578 |
| Example 1a Ascorbic Acid + $K_2CO_3$ | 10 | 9.2 | 10 | 10 | 1832 |
| Comparative Example | 10 | 8.8 | 10 | 8 | 1862 |
| 2 week | | | | | |
| Untreated Control | 3 | / | / | / | 1014 |
| Ascorbic Acid Control | 8.4 | 7 | 7 | 9 | 1072 |
| Example 1a Ascorbic Acid + $K_2CO_3$ | 10 | 8.8 | 7 | 9 | 1083 |
| Comparative Example | 10 | 8.6 | 7 | 8 | 1087 |

Example 2a

Bartlett pears were preserved with the fresh produce preservative as in Example 1a, with preservative solution that contained 4% ascorbic acid and 1.59% $K_2CO_3$. For comparison, pears were treated with a comparative solution that contained 4% ascorbic acid and 1.22% $Na_2CO_3$. The results are shown in Table 2.

TABLE 2

Evaluation of Sliced Pears
Preserved with Fresh Produce Preservative

| Example | Color | Flavor | Texture | Moistness | Hardness (g) |
|---|---|---|---|---|---|
| 0 hour | | | | | |
| Untreated Control | 9.9 | 10 | 10 | 10 | 2324 |
| Ascorbic Acid Control | 10 | 5 | 10 | 10 | 2215 |
| Example 2a Ascorbic Acid + $K_2CO_3$ | 10 | 8.4 | 10 | 10 | 1714 |
| Comparative Solution | 10 | 6 | 10 | 10 | 2302 |
| 1 day | | | | | |
| Untreated Control | 6 | 10 | 9.2 | 10 | |
| Ascorbic Acid Control | 10 | 9 | 9.6 | 10 | |
| Example 2a Ascorbic Acid + $K_2CO_3$ | 10 | 9.6 | 9.8 | 10 | |
| Comparative Solution | 10 | 7.6 | 10 | 10 | |
| 1 week | | | | | |
| Untreated Control | 4.8 | / | / | / | 360 |
| Ascorbic Acid Control | 8.6 | 8.8 | 3 | 7 | 315 |
| Example 2a Ascorbic Acid + $K_2CO_3$ | 10 | 9 | 9 | 8.6 | 1049 |
| Comparative Solution | 10 | 8.6 | 9 | 8 | 1376 |
| 2 weeks | | | | | |
| Untreated Control | 5 | / | / | / | 209 |
| Ascorbic Acid Control | 6.4 | 3.4 | 1 | / | 79 |
| Example 2a Ascorbic Acid + $K_2CO_3$ | 10 | 8.6 | 6.6 | 8 | 437 |
| Comparative Solution | 9.8 | 7.2 | 6.4 | 7.6 | 492 |

Example 3a

Red Delicious apples and Granny Smith apples were preserved with the fresh produce preservative as in Example 1a, except that the preservative solution contained 4% ascorbic acid and 1% $Li_2CO_3$. The results are shown in Tables 3&4.

Example 3b

Red Delicious apples and Granny Smith apples were preserved with the fresh produce preservative as in Example 3a, except that the preservative solution contained 4% ascorbic acid and 1.6% $BaCl_2$.

Example 3c

Red Delicious apples and Granny Smith apples were preserved with the fresh produce preservative as in Example 3a, except that the preservative solution contained 4% ascorbic acid and 1.5% $SrCl_2.6H_2O$.

Example 3d

Red Delicious apples and Granny Smith apples were preserved with the fresh produce preservative as in Example 3a, except that the preservative solution contained 3.5% ascorbic acid and 1% $NH_4Cl$.

Example 3e

Red Delicious apples and Granny Smith apples were preserved with the fresh produce preservative as in Example 3a, except that the preservative solution contained 3.5% ascorbic acid and 1.6% $CuSO_4$.

Example 3f

Red Delicious apples and Granny Smith apples were preserved with the fresh produce preservative as in Example 3a, except that the preservative solution contained 4% ascorbic acid and 1.5% $FeCl_2 \cdot xH_2O$.

Example 3g

Red Delicious apples and Granny Smith apples were preserved with the fresh produce preservative as in Example 3a, except that the preservative solution contained 3% ascorbic acid and 1.5% $FeCl_2 \cdot xH_2O$.

Example 3h

Red Delicious apples and Granny Smith apples were preserved with the fresh produce preservative as in Example 3a, except that the preservative solution contained 1.8% ascorbic acid and 0.72% $FeCl_2$.

Example 3i

Red Delicious apples and Granny Smith apples were preserved with the fresh produce preservative as in Example 3a, except that the preservative solution contained 4% ascorbic acid and 1.75% $FeSO_4$.

Example 3j

Red Delicious apples and Granny Smith apples were preserved with the fresh produce preservative as in Example 3a, except that the preservative solution contained 3% ascorbic acid and 1.25% $FeSO_4$.

Example 3k

Red Delicious apples and Granny Smith apples were preserved with the fresh produce preservative as in Example 3a, except that the preservative solution contained 1.8% ascorbic acid and 0.75% $FeSO_4$.

Example 3l

Red Delicious apples and Granny Smith apples were preserved with the fresh produce preservative as in Example 3a, except that the preservative solution contained 4% ascorbic acid and 1.9% $FeCl_3$.

Example 3m

Red Delicious apples and Granny Smith apples were preserved with the fresh produce preservative as in Example 3a, except that the preservative solution contained 3% ascorbic acid and 1.4% $FeCl_3$.

Example 3n

Red Delicious apples and Granny Smith apples were preserved with the fresh produce preservative as in Example 3a, except that the preservative solution contained 2% ascorbic acid and 0.95% $FeCl_3$.

Example 3o

Red Delicious apples and Granny Smith apples were preserved with the fresh produce preservative as in Example 3a, except that the preservative solution contained 4% ascorbic acid and 2.28% $MnCl_2 \cdot 4H_2O$.

Example 3p

Red Delicious apples and Granny Smith apples were preserved with the fresh produce preservative as in Example 3a, except that the preservative solution contained 4% ascorbic acid and 0.56% $MnCO_3$.

TABLE 3

Evaluation of Sliced Red Delicious Apples Preserved with Fresh Produce Preservative

| Example | 24 hours (app) | 3 days | 1 week |
|---|---|---|---|
| Example 3a Ascorbic Acid + $Li_2CO_3$ | 10 | 10 | 10 |
| Example 3b Ascorbic Acid + $BaCl_2$ | 10 | 10 | 10 |
| Example 3c Ascorbic Acid + $SrCl_2$ | 10 | 6 | 5 |
| Example 3d Ascorbic Acid + $NH_4Cl$ | 10 | 8 | 5.5 |
| Example 3e Ascorbic Acid + $CuSO_4$ | 8 | 4 | / |
| Example 3f Ascorbic Acid + $FeCl_2$ | 7.5 | 6 | / |
| Example 3g Ascorbic Acid + $FeCl_2$ | 10 | 6 | / |
| Example 3h Ascorbic Acid + $FeCl_2$ | 10 | 6 | / |
| Example 3i Ascorbic Acid + $FeSO_4$ | 8 | 4.5 | / |
| Example 3j Ascorbic Acid + $FeSO_4$ | 10 | 6 | / |
| Example 3k Ascorbic Acid + $FeSO_4$ | 9.5 | 6 | / |
| Example 3l Ascorbic Acid + $FeCl_3$ | 7.5 | 7 | 4 |
| Example 3m Ascorbic Acid + $FeCl_3$ | 8 | 8 | 6 |
| Example 3n Ascorbic Acid + $FeCl_3$ | 10 | 10 | 6 |
| Example 3o Ascorbic Acid + $MnCl_2$ | 9.5 | 9.5 | 8 |
| Example 3p Ascorbic Acid + $MnCO_3$ | 10 | 10 | 7.5 |
| Ascorbic Acid | 9 | 9 | 6 |

Untreated apples discolored within one hour.

TABLE 4

Evaluation of Sliced Granny Smith Apples Preserved with Fresh Produce Preservative

| Example | 1 day | 3 days | 1 week |
|---|---|---|---|
| Example 3a Ascorbic Acid + $Li_2CO_3$ | 10 | 10 | 10 |
| Example 3b Ascorbic Acid + $BaCl_2$ | 10 | 10 | 10 |
| Example 3c Ascorbic Acid + $SrCl_2$ | 10 | 7 | 6 |
| Example 3d Ascorbic Acid + $NH_4Cl$ | 10 | 8.5 | 6 |
| Example 3e Ascorbic Acid + $CuSO_4$ | 10 | 4 | / |
| Example 3f Ascorbic Acid + $FeCl_2$ | 7 | 6 | / |
| Example 3g Ascorbic Acid + $FeCl_2$ | 10 | 6 | / |
| Example 3h Ascorbic Acid + $FeCl_2$ | 10 | 7 | 6 |

TABLE 4-continued

Evaluation of Sliced Granny Smith Apples
Preserved with Fresh Produce Preservative

| Example | 1 day | 3 days | 1 week |
|---|---|---|---|
| Example 3i<br>Ascorbic Acid + FeSO$_4$ | 8 | 5 | / |
| Example 3j<br>Ascorbic Acid + FeSO$_4$ | 10 | 6 | / |
| Example 3k<br>Ascorbic Acid + FeSO$_4$ | 10 | 9 | 6 |
| Example 3l<br>Ascorbic Acid + FeCl$_3$ | 9 | 9 | 6 |
| Example 3m<br>Ascorbic Acid + FeCl$_3$ | 10 | 10 | 6 |
| Example 3n<br>Ascorbic Acid + FeCl$_3$ | 10 | 10 | 6 |
| Example 3o<br>Ascorbic Acid + MnCl$_2$ | 10 | 10 | 10 |
| Example 3p<br>Ascorbic Acid + MnCO$_3$ | 10 | 10 | 10 |
| Control<br>Ascorbic Acid | 10 | 10 | 6 |

Both the untreated Granny Smith apples and the Red Delicious apples started to discolor right after being cut. The color score dropped to lower than 7 between 5-30 minutes after being cut.

Example 4a

Bartlett pears were preserved with the fresh produce preservative as in Example 1a, except that the preservative solution contained 4% ascorbic acid and 1% Li$_2$CO$_3$. The results are shown in Table 5.

Example 4b

Bartlett pears were preserved with the fresh produce preservative as in Example 4a, except that the preservative solution contained 4% ascorbic acid and 1.6% BaCl$_2$.

Example 4c

Bartlett pears were preserved with the fresh produce preservative as in Example 4a, except that the preservative solution contained 4% ascorbic acid and 1.5% SrCl$_2$.6H$_2$O.

Example 4d

Bartlett pears were preserved with the fresh produce preservative as in Example 4a, except that the preservative solution contained 4% ascorbic acid and 1.75% FeSO$_4$.

Example 4e

Bartlett pears were preserved with the fresh produce preservative as in Example 4a, except that the preservative solution contained 4% ascorbic acid and 1.9% FeCl$_3$.

Example 4f

Bartlett pears were preserved with the fresh produce preservative as in Example 1a, except that the preservative solution contained 4% ascorbic acid and 2.28% MnCl$_2$.4H$_2$O.

Example 4g

Bartlett pears were preserved with the fresh produce preservative as in Example 1a, except that the preservative solution contained 4% ascorbic acid and 0.56% MnCO$_3$.

TABLE 5

Evaluation of Sliced Bartlett Pears
Preserved with Fresh Produce Preservative

| Example | 1 day | 2 days | 1 week |
|---|---|---|---|
| Example 4a<br>Ascorbic Acid and Li$_2$CO$_3$ | 10 | 10 | 9 |
| Example 4b<br>Ascorbic Acid and BaCl$_2$ | 10 | 10 | 8.5 |
| Example 4c<br>Ascorbic Acid and SrCl$_2$ | 9 | 8 | 5 |
| Example 4d<br>Ascorbic Acid and FeSO$_4$ | 10 | 9 | 6 |
| Example 4e<br>Ascorbic Acid and FeCl$_3$ | 10 | 10 | 10 |
| Example 4f<br>Ascorbic Acid and MnCl$_2$ | 10 | 10 | 10 |
| Example 4g<br>Ascorbic Acid and MnCO$_3$ | 10 | 10 | 5 |
| Control<br>Ascorbic Acid | 10 | 6 | / |

The color score of untreated cut Bartlett pears dropped to lower than 7 in 4 hours after the pears were cut.

Example 5a

Hass avocadoes were preserved with the fresh produce preservative as in Example 1a, except that the preservative solution contained 9.3% ascorbic acid and 5.7% MnCl$_2$.4H$_2$O. The results are shown in Table 6.

Example 5b

Hass avocadoes were preserved with the fresh produce preservative as in Example 5a, except that the preservative solution contained 6.2% ascorbic acid and 3.8% MnCl$_2$.4H$_2$O.

Example 5c

Hass avocadoes were preserved with the fresh produce preservative as in Example 5a, except that the preservative solution contained 10.2% ascorbic acid and 4.8% FeCl$_3$.

Example 5d

Hass avocadoes were preserved with the fresh produce preservative as in Example 5a, except that the preservative solution contained 6.8% ascorbic acid and 3.2% FeCl$_3$.

Example 5e

Hass avocadoes were preserved with the fresh produce preservative as in Example 5a, except that the preservative solution contained 8% ascorbic acid and 3.5% FeSO$_4$.

TABLE 6

Evaluation of Sliced Hass Avocadoes
Preserved with Fresh Produce Preservative

| Example | 1 day | 4 days | 1 week |
|---|---|---|---|
| Example 5a<br>Ascorbic Acid + MnCl$_2$ | 10 | 10 | 10 |
| Example 5b<br>Ascorbic Acid + MnCl$_2$ | 10 | 9 | 7.5 |
| Example 5c<br>Ascorbic Acid + FeCl$_3$ | 8 | 8 | 8 |

TABLE 6-continued

Evaluation of Sliced Hass Avocadoes
Preserved with Fresh Produce Preservative

| Example | 1 day | 4 days | 1 week |
|---|---|---|---|
| Example 5d Ascorbic Acid + FeCl$_3$ | 8 | 8 | 8 |
| Example 5e Ascorbic Acid + FeSO$_4$ | 10 | 10 | 7 |
| 6% Ascorbic Acid control | 6 | / | / |
| 7% Ascorbic Acid control | 7 | 6 | / |
| 8% Ascorbic Acid control | 8.5 | 6 | / |

The untreated, control Hass avocadoes started to discolor right after being sliced. The color score dropped to lower than 7 within 1-2 hours after slicing.

Example 6a

Sliced Hass avocadoes were preserved with the fresh produce preservative as in Example 1a, except that the preservative solution contained 6.5% ascorbic acid and 3.5% potassium chloride. For control, a 7% ascorbic acid solution was used. The results are shown in Table 7.

Example 6b

Sliced Hass avocadoes were preserved with the fresh produce preservative as in Example 6a, except that the preservative solution contained 6.5% ascorbic acid, 3% potassium chloride, and 0.5% calcium chloride.

Example 6c

Sliced Hass avocadoes were preserved with the fresh produce preservative as in Example 6a, except that the preservative solution contained 6.5% ascorbic acid, 1.5% potassium chloride, and 2% calcium chloride.

Example 6d

Sliced Hass avocadoes were preserved with the fresh produce preservative as in Example 6a, except that the preservative solution contained 7% ascorbic acid, 1% potassium chloride, and 2% calcium chloride.

Example 6e

Sliced Hass avocadoes were preserved with the fresh produce preservative as in Example 6a, except that the preservative solution contained 7% ascorbic acid, 2.5% potassium chloride, and 0.5% calcium chloride.

TABLE 7

Evaluation of Sliced Hass Avocadoes Preserved with
Fresh Produce Preservative

| Example | 1 day | 2 days | 4 days | 1 week |
|---|---|---|---|---|
| Example 6a 6.5% Ascorbic Acid + 3.5% Potassium Chloride | 10 | 10 | 10 | 9.5 |
| Example 6b 6.5% Ascorbic Acid + 3% Potassium Chloride + 0.5% Calcium Chloride | 10 | 10 | 10 | 9.5 |
| Example 6c 6.5% Ascorbic Acid + 1.5% Potassium Chloride + 2% Calcium Chloride | 10 | 10 | 9.75 | 9 |
| Example 6d 7% Ascorbic Acid + 1% Potassium Chloride + 2% Calcium Chloride | 10 | 10 | 9.75 | 9.5 |
| Example 6e 7% Ascorbic Acid + 2.5% Potassium + 0.5% Chloride Calcium Chloride | 10 | 10 | 10 | 8.5 |
| Control 7% Ascorbic Acid | 7 | 6 | / | / |

Example 7a

Whole Russet potatoes were washed with tap water to remove dirt. The potatoes were then peeled and diced into about 0.5 inch×0.5 inch size cubes. The diced potatoes then rinsed with tap water to remove surface starch and drained for 2-3 minutes. The diced potatoes were then immersed into a fresh produce preservative solution that contained 4.0% ascorbic acid and 1.43 manganese chloride, for 60 seconds to 120 seconds and excess solution was drained for 2-3 minutes. The treated potatoes were packed with 3 mil polyethylene bags and the bags were heat sealed and stored at 2-5° C. for observation. For comparison, potatoes were treated with a solution that contained 4.0% ascorbic acid and 0.33% sodium chloride or 4.0% ascorbic acid and 0.6% sodium carbonate. The results are shown in Table 8.

Example 7b

Sliced Russet potatoes were preserved with the fresh produce preservative as in Example 7a, except that the preservative solution contained 4.0% ascorbic acid and 1.43% ferrous chloride.

Example 7c

Sliced Russet potatoes were preserved with the fresh produce preservative as in Example 7a, except that the preservative solution contained 4.0% ascorbic acid and 2.36% barium chloride.

Example 7d

Sliced Russet potatoes were preserved with the fresh produce preservative as in Example 7a, except that the preservative solution contained 4.0% ascorbic acid and 1.78% strontium chloride.

Example 7e

Sliced Russet potatoes were preserved with the fresh produce preservative as in Example 7a, except that the preservative solution contained 4.0% ascorbic acid and 0.84% strontium carbonate.

Example 7f

Sliced Russet potatoes were preserved with the fresh produce preservative as in Example 7a, except that the preservative solution contained 4.0% ascorbic acid and 0.48% lithium chloride.

Example 7g

Sliced Russet potatoes were preserved with the fresh produce preservative as in Example 7a, except that the preservative solution contained 4.0% ascorbic acid and 0.42% lithium carbonate.

Example 7h

Sliced Russet potatoes were preserved with the fresh produce preservative as in Example 7a, except that the preservative solution contained 4.0% ascorbic acid and 0.84% potassium chloride.

Example 7i

Sliced Russet potatoes were preserved with the fresh produce preservative as in Example 7a, except that the preservative solution contained 4.0% ascorbic acid and 1.1% potassium bicarbonate.

TABLE 8

Evaluation of Sliced Russet Potatoes Preserved with Fresh Produce Preservative

| Example | day 2 | day 5 | day 9 | day 12 | day 16 |
|---|---|---|---|---|---|
| Example 7a<br>4.0% Ascorbic Acid + 1.43 Manganese Chloride | 10 | 10 | 10 | 10 | 10 |
| Example 7b<br>4.0% Ascorbic Acid + 1.43% Ferrous Chloride | 1 | 1 | 1 | 1 | 1 |
| Example 7c<br>Ascorbic Acid + 2.36% Barium Chloride | 10 | 10 | 10 | 10 | 10 |
| Example 7d<br>Ascorbic Acid + 1.78% Strontium Chloride | 10 | 10 | 10 | 10 | 10 |
| Example 7e<br>Ascorbic Acid + 0.84% Strontium Carbonate | 10 | 9.5 | 9 | 7 | 7 |
| Example 7f<br>Ascorbic Acid + 0.48% Lithium Chloride | 10 | 10 | 10 | 10 | 10 |
| Example 7g<br>Ascorbic Acid + 0.42% Lithium Carbonate | 10 | 10 | 10 | 9 | 8 |
| Example 7h<br>Ascorbic Acid + 0.84% Potassium Chloride | 10 | 10 | 10 | 10 | 10 |
| Example 7i<br>Ascorbic Acid + 1.1% Potassium Bicarbonate | 10 | 10 | 10 | 10 | 8 |
| Comparative Solution<br>Ascorbic Acid + 0.33% Sodium Chloride | 10 | 10 | 10 | 10 | 10 |
| Comparative Solution<br>Ascorbic Acid + 0.6% Sodium Carbonate | 10 | 10 | 10 | 9 | 7 |
| Untreated Control | 6 | 4 | 4 | 4 | 4 |

Example 8a

Celery was washed with tap water to remove dirt and soil, sanitized with 100-150 parts per million sodium hypochlorite water (chlorine water) for 1 minute, and the excess chlorine water was drained for 2-3 minutes. The celery was then cut into about 3 inch long by 0.25-0.30 inch wide sticks, sanitized with 100 parts per million chlorine water for 1 minute and then drained for 2-3 minutes. The celery sticks were then immersed into a preservative solution containing 3.52% ascorbic acid and 1.97% manganese chloride-4H$_2$O, for 2-3 minutes. The treated celery sticks were drained for 2-3 minutes, packed into polyethylene bags which were then heat sealed and stored at 2-5° C. The results are shown in Table 9.

Example 8b

Sliced celery sticks were preserved with the fresh produce preservative as in Example 8a except that the preservative solution contained 3.52% ascorbic acid and 1.26% ferrous chloride-6H$_2$O.

TABLE 9

Evaluation of Sliced Celery Sticks Preserved with Fresh Produce Preservative

| Example | Day 2 | Day 6 | Day 9 | Day 14 |
|---|---|---|---|---|
| Example 8a<br>Ascorbic Acid + Manganese Chloride | 10 | 9.5 | 8 | 4 |
| Example 8b<br>Ascorbic Acid + Ferrous Chloride | 10 | 9 | 6 | 4 |
| Untreated controls | 6 | 4 | 4 | 4 |

Example 9a

Sliced Celery Sticks were preserved with the fresh produce preservative as in Example 8a except that the preservative solution contained 4.0% ascorbic acid and 1.18% barium chloride. The results are shown in Table 10.

Example 9b

Sliced Celery Sticks were preserved with the fresh produce preservative as in Example 9a except that the preservative solution contained 4.0% ascorbic acid and 1.51% strontium chloride-6H$_2$O.

Example 9c

Sliced Celery Sticks were preserved with the fresh produce preservative as in Example 9a except that the preservative solution contained 4.0% ascorbic acid and 0.84% strontium carbonate.

Example 9d

Sliced Celery Sticks were preserved with the fresh produce preservative as in Example 9a except that the preservative solution contained 4.0% ascorbic acid and 0.48% lithium chloride.

Example 9e

Sliced Celery Sticks were preserved with the fresh produce preservative as in Example 9a except that the preservative solution contained 4.0% ascorbic acid and 0.84% lithium carbonate.

TABLE 10

Evaluation of Sliced Celery Sticks Preserved with Fresh Produce Preservative

| Example | Day 2 | Day 5 | Day 8 | Day 12 |
|---|---|---|---|---|
| Example 9a Ascorbic Acid + Barium Chloride | 10 | 10 | 8 | 7 |
| Example 9b Ascorbic Acid + Strontium Chloride | 10 | 10 | 8 | 7 |
| Example 9c Ascorbic Acid + Strontium Carbonate | 8.5 | 8 | 7 | 7 |
| Example 9d Ascorbic Acid + Lithium Chloride | 10 | 9.5 | 6 | 6 |
| Example 9e Ascorbic Acid + Lithium Carbonate | 7 | 6 | 5 | 4 |
| Untreated | 9 | 8 | 6 | 5 |

Example 10a

Whole mushrooms were washed with 0.25% sodium carbonate solution for 30 seconds to remove dirt and then drained for about 20 to 30 seconds. The mushrooms were then immersed into a fresh preservative solution containing 4.0% ascorbic acid and 0.63% lithium carbonate for 30 seconds; excess solution was drained for 2-3 minutes. The treated mushrooms were then transferred to perforated plastic containers, placed in paper bags, and stored at 2-5° C. For comparison, whole mushrooms were treated with a solution that contained 4.0% ascorbic acid and 0.8% sodium carbonate or contained 4.0% ascorbic acid and 0.6% sodium hydroxide. Untreated mushrooms were used as controls. The results are shown in Table 11.

Example 10b

Whole mushrooms were preserved as in Example 10a except that the fresh produce preservative solution contained 4.0% ascorbic acid and 1.1% strontium carbonate.

Example 10c

Whole mushrooms were preserved as in Example 10a except that the fresh produce preservative solution contained 4.0% ascorbic acid and 1.0% potassium carbonate.

Example 10d

Whole mushrooms were preserved as in Example 10a except that the fresh produce preservative solution contained 4.0% ascorbic acid and 0.8% potassium hydroxide.

TABLE 11

Evaluation of Whole Mushrooms Preserved with Fresh Produce Preservative

| Example | day 2 | day 5 | day 7 | day 9 |
|---|---|---|---|---|
| Ascorbic Acid + Lithium Carbonate | 8 | 7 | 6 | 5 |
| Ascorbic Acid + Strontium Carbonate | 9.5 | 7.5 | 7 | 7 |
| Ascorbic Acid + Potassium Carbonate | 9.5 | 8 | 8 | 7.5 |
| Ascorbic Acid + Potassium Hydroxide | 9 | 6 | 6 | 6 |
| Comparative Solution Ascorbic Acid + Sodium Carbonate | 9 | 8.5 | 8.5 | 7.5 |
| Comparative Solution Ascorbic Acid + Sodium Hydroxide | 9 | 6 | 6 | 5 |
| Untreated Controls | 8 | 7 | 7 | 7 |

Example 11a

Whole Bramley apples free from blemishes or bruises, were rinsed with water, sanitized with a sodium hypochlorite solution having 100 parts per million available chlorine, for two minutes, then peeled, cored, and sliced. The sliced apples were dipped into a fresh produce preservative solution that contained 5.12% strontium ascorbate; the fresh produce preservative solution contained 4.12% ascorbic acid and 1.79% $Sr_2CO_3$, for about 30 to 60 seconds. The apples were then drained in a colander for one minute. The apple slices and the colander were placed in 500 micron plastic bags from SunSct Packaging, stored at 4° C. and evaluated several times over a 15 day period. Water which collected in the plastic bag was removed and weighed.

For comparison, similarly prepared apple slices were placed in one of several solutions that contained either: 4.3% ascorbic acid and 1.13% hydrated $MgCO_3$, specifically $4MgCO_3 \cdot Mg(OH)_2 5H_2O$ or a 5.0% w/w aqueous solution of calcium ascorbate dihydrate, having a pH of 7.2; or a 5.3% w/w solution, of 4.12% ascorbic acid and 1.17% calcium carbonate, or 6% ascorbic acid having a pH of 2.3; or 48 g ascorbic acid, 48 g citric acid, 16 g $CaCl_2$ and 48 g NaCl in 800 g water, with a pH of 1.2; or 6% w/w citric acid and 6% w/w ascorbic acid; or 4.64% sodium ascorbate having 4.13% ascorbic acid and 1.18% $NaCo_3$. The results are shown in Table 12.

Example 11b

Bramley apples were preserved with the fresh produce preservative as in Example 11a, except that the apple slices were dipped into the 5.02% potassium ascorbate fresh produce preservative solution containing 4.3% ascorbic acid and 1.62% $K_2CO_3$.

TABLE 12

Evaluation of Sliced Apples Preserved with Fresh Produce Preservative

| Example | 4 hr | 28 hr | 52 hr | 94 hr | 191 hr | 335 hr. |
|---|---|---|---|---|---|---|
| Comparative Solutions | | | | | | |
| Ascorbic Acid | | | | Becoming soft | brown | (discarded at 191 hours) |
| Texture | | Firm | Firm | becoming brown | soft | (discarded at 191 hours) |

TABLE 12-continued

Evaluation of Sliced Apples
Preserved with Fresh Produce Preservative

| Example | 4 hr | 28 hr | 52 hr | 94 hr | 191 hr | 335 hr. |
|---|---|---|---|---|---|---|
| Water Released (g) Citric/Ascorbic Acid | 6.78 | 5.34 | 4.19 | 2.94 Some browning | 2.63 | Brown tissue through some slices |
| Texture | | Soft, rubbery | Soft, rubbery | Soft, rubbery | Soft, rubbery | Soft to touch, |
| Water (g) Calcium Ascorbate Dihydrate | 10.00 | 9.00 | 9.81 | 8.97 | 7.46 | 6.85 Good condition |
| Texture | | Firm | Firm | Firm | Firm | Firm |
| Water (g) 4.12% Ascorbic Acid and 1.17% Calcium Carbonate | 6.84 | 5.88 | 5.56 | 4.00 | 2.67 | 1.33 |
| Texture | | Firm | Firm | Firm | Firm | |
| Water (g) Example 4a | 6.95 | 6.28 | 5.34 | 4.60 | 2.78 | 1.86 Still white |
| Texture | | Soft, rubbery | Soft, rubbery | Soft, rubbery | Soft, rubbery | Soft & rubbery |
| Water (g) Sodium Ascorbate | 18.04 | 25.94 | 28.52 | 31.92 | 39.04 | 34.71 Internal browning on some |
| Texture | Firm | Firm | Firm | Firm | Firm | Some Internal browning, soft, where brown |
| Water (g) Magnesium Ascorbate Preservative | 6.58 | 6.74 Good color | 6.67 Good color | 4.87 Good color | 4.08 Good color | 3.77 Good color |
| Texture | | Firm | Firm | Firm | Firm | Firm and crisp |
| Water(g) Preservative Solutions | 6.54 | 7.07 | 6.43 | 4.75 | 3.73 | 2.17 |
| Potassium Ascorbate Preservative | | | | | | brown through out slices |
| Texture | | Firm | Firm | Firm | Firm | Soft |
| Water (g) Strontium Ascorbate Preservative | 7.65 | 6.97 | 7.17 | 5.82 | 3.65 | 1.82 No internal browning |
| Texture | | Very Firm | Very Firm | Very Firm | Very Firm | Very Firm, crisp |
| Water (g) | 7.96 | 4.99 | 9. | 3.98 | 3.07 | 2.08 |

* control apples were cut before evaluation

Example 12a

Bramley apples were preserved with the fresh produce preservative as in Example 11a except that the preservative solution contained lithium ascorbate. The lithium ascorbate solution was prepared by adding 7.35 grams of lithium carbonate and 35 grams ascorbic acid to 800 grams water. The preservative solution had a pH of 5.7.

For comparison, apple slices were placed in one of several comparative solutions: a 5.0% w/w aqueous solution of calcium ascorbate dihydrate containing 42.5 grams of calcium ascorbate dihydrate and 800 grams water with a pH of 7; a 5.3% w/w solution of calcium ascorbate containing 44.94 grams of mixture of 9.95 grams calcium carbonate and 35 grams ascorbic acid in 800 grams water with a pH of 5.5; a comparative solution, containing 48 g ascorbic acid, 48 g citric acid, 16 g $CaCl_2$, 48 g NaCl and 800 g water with a pH of 1.2; a comparative solution of sodium ascorbate containing 28.45 grams of sodium carbonate 35 grams ascorbic acid, 800 grams water having a pH of 6.8; a comparative solution of calcium ascorbate containing 8.75 grams of calcium carbonate, 35 grams ascorbic acid, and to 800 grams water; a comparative solution of calcium ascorbate containing 9.95 grams of calcium carbonate, 35 grams ascorbic acid, and 765 grams water; a comparative solution of magnesium ascorbate containing 9.66 grams of hydrated magnesium carbonate $4MgCO_3 \cdot Mg(OH)_2 5H_2O$, 35 grams ascorbic acid, 765 grams water, having a pH of 6.4; and a comparative solution of zinc ascorbate containing 35 grams ascorbic acid, 12.74 grams zinc carbonate and 765 grams water, with a pH of 5.5. The apple slices were evaluated on day five. The results are shown in Table 13.

Example 12b

Bramley apples were preserved as in Example 12a, except that the preservative solution contained 13.74 grams of potassium carbonate, 35 grams ascorbic acid, 765 grams water, having a pH of 6.8 to provide a 5.2% potassium ascorbate solution.

Example 12c

Bramley apples were preserved as in Example 12a, except that the preservative solution contained 14.68 grams of strontium carbonate, 35 grams ascorbic acid, 765 g water, having pH of 5.3, to provide a 5.44% % (w/w) strontium ascorbate solution.

Example 12d

Bramley apples were preserved as in Example 4, except that the preservative solution contained 3% (w/v) barium ascorbate. The barium ascorbate solution was prepared by adding 19.62 grams of barium carbonate and 35 grams ascorbic acid to 765 grams water, having a pH of 5.8.

TABLE 13

Evaluation at Day 5 of Sliced Apples Preserved with Fresh Produce Preservative

| Example | Color | Texture | Water Released (grams) |
|---|---|---|---|
| Comparative Solutions Citric Acid/Ascorbic Acid | | | |
| Calcium Ascorbate Dihydrate Solution | White | Very Firm | Minimal loss |
| Calcium Carbonate and Ascorbic Acid Solution | White | Very Firm | Minimal loss |
| Ascorbic Acid, Citric Acid, CaCl$_2$, NaCl Solution | | | |
| Sodium Ascorbate | White | Firm | Minimal loss |
| Zinc Ascorbate | Brown | Very Soft | Minimal loss |
| Magnesium Ascorbate | White | Very Firm | Minimal loss |
| Preservative Solutions | | | |
| Example 12b Potassium Ascorbate | White | Firm | Minimal loss |
| Example 12c Strontium Ascorbate | White | Very Firm | Minimal loss |
| Example 12d Barium Ascorbate | White | Very Firm | Minimal loss |
| Example 12a Lithium Ascorbate | Brown | Soft | Minimal loss |

Example 13

Celery was washed with tap water to remove dirt and soil, sanitized with 100-150 parts per million sodium hypochlorite water (chlorine water) for 1 minute, and the excess chlorine water was drained for 2-3 minutes. The celery was then cut into about 3 inch long by 0.25-0.30 inch wide sticks, sanitized with 100 parts per million chlorine water for 1 minute and then drained for 2-3 minutes. The celery sticks were then immersed into a preservative solution containing 4% ascorbic acid and 1.0% potassium chloride, for 2-3 minutes. The treated celery sticks were drained for 2-3 minutes, packed into polyethylene bags which were then heat sealed and stored at 2-5° C. For comparison, celery was stick were treated with a solution containing either 4% ascorbic acid and 1.0% sodium chloride or 4% ascorbic acid and 1% calcium chloride. The results are shown in Table 14.

TABLE 14

Evaluation of Sliced Celery Sticks Preserved with Fresh Produce Preservative

| Example | Observation at day 5 | Observation at day 7 | Observation at day 11 | Observation at day 15 |
|---|---|---|---|---|
| Example 13 Ascorbic Acid + Potassium Chloride | 10 | 9.5 | 9 | 6 |
| Comparative Solution Ascorbic Acid + Sodium Chloride | 9 | 8 | 8 | 6 |
| Comparative Solution Ascorbic Acid + Calcium Chloride | 10 | 10 | 9.5 | 6 |
| Untreated | 5 | 4 | 4 | 4 |

Example 14a

Whole Red Delicious apples were rinsed with tap water, sanitized with 100 ppm sodium hypochlorite solution, cored, and sliced. The apple slices were immerged in the water for ½ to 2 minutes. Then the apple slices were dipped for 1 minute into the following solutions: 3% ascorbic acid and 0.8% NH$_4$Cl. For comparison, untreated slices were used as well as apple slices treated with 3% ascorbic acid or 2% ascorbic acid. The apples were removed, drained for 1-2 minutes, sealed in 2 mil, polyethylene bags, and stored at 2-5 C.°. The results are show in Table 15.

Example 14b

Red Delicious apples were preserved with the fresh produce preservative as in Example 14a, except that the preservative solution contained 2.0% ascorbic acid and 0.8% NH$_4$Cl.

Example 14c

Red Delicious apples were preserved with the fresh produce preservative as in Example 14a, except that the preservative solution contained 3.0% ascorbic acid and 0.5% (NH$_4$)$_2$CO$_3$.

Example 14d

Red Delicious apples were preserved with the fresh produce preservative as in Example 14a, except that the preservative solution contained 2.0% ascorbic acid and 0.5% (NH$_4$)$_2$CO$_3$.

TABLE 15

Evaluation of Sliced Red Delicious Apples Preserved with Fresh Produce Preservative

| Example | 1 hour | 24 hours | Day 3 | Day 4 | Day 5 | Day 6 |
|---|---|---|---|---|---|---|
| Untreated Control | 6 | 4.67 | 4 | 4 | 4 | 4 |
| 3% Ascorbic Acid Control | 10 | 6 | 6 | 4 | 4 | 4 |
| 2% Ascorbic Acid Control | 10 | 5.33 | 5 | 6 | 6 | 6 |
| 3% Ascorbic Acid 0.8% NH$_4$Cl | 10 | 10 | 10 | 10 | 10 | 10 |
| 2% Ascorbic Acid 0.8% NH$_4$Cl | 10 | 10 | 8.33 | 8 | 7 | 7 |

TABLE 15-continued

Evaluation of Sliced Red Delicious Apples
Preserved with Fresh Produce Preservative

| Example | 1 hour | 24 hours | Day 3 | Day 4 | Day 5 | Day 6 |
|---|---|---|---|---|---|---|
| 3% Ascorbic Acid + 0.5% (NH$_4$)$_2$CO$_3$ | 10 | 9.67 | 9.5 | 9.5 | 9.5 | 9.5 |
| 2% Ascorbic Acid + 0.5% (NH$_4$)$_2$CO$_3$ | 10 | 9.5 | 9.5 | 9.5 | 9.5 | 9.5 |

Example 15a

Red Delicious apples were preserved with the fresh produce preservative as in Example 14a, except that the preservative solution contained 3.0% ascorbic acid and 0.8% CuSO$_4$. The results are shown in Table 16.

Example 15b

Red Delicious apples were preserved with the fresh produce preservative as in Example 15a, except that the preservative solution contained 2.0% ascorbic acid and 0.8% NH$_4$Cl.

TABLE 16

Evaluation of Sliced Red Delicious Apples
Preserved with Fresh Produce Preservative

| Example | 1 hour | 24 hours | Day 3 |
|---|---|---|---|
| Untreated Control | 6 | 4 | 4 |
| 3% Ascorbic Acid Control | 10 | 6 | 6 |
| 2% Ascorbic Acid Control | 10 | 5 | 5 |
| 3.0% Ascorbic Acid + 0.8% CuSO$_4$ | 10 | 9 | 6 |
| 2.0% Ascorbic Acid + 0.8% CuSO$_4$ | 10 | 8 | 6 |

Example 16a

Fresh sliced Russet Potato were preserved with the fresh produce preservative as in Example 7a, except that the preservative solution contained 4.0% ascorbic acid and 2.74% AlCl$_3$ 6H$_2$O. For comparison, untreated slices were used. The results are shown in Table 17.

Example 16b

Fresh sliced Russet Potato were preserved with the fresh produce preservative as in Example 16a, except that the preservative solution contained 4.0% ascorbic acid and 1.82% AlCl$_3$ 6H$_2$O.

Example 16c

Fresh sliced Russet Potato were preserved with the fresh produce preservative as in Example 16a, except that the preservative solution contained 4.0% ascorbic acid and 3.43% AlNH$_4$(SO$_4$)$_2$ 12H$_2$O.

TABLE 17

Evaluation of Fresh Sliced Russet Potatoes
Preserved with Fresh Produce Preservative

| Example | day 2 | day 4 | day 7 | day 9 | Day 14 | Day 16 |
|---|---|---|---|---|---|---|
| Example 16a 4.0% Ascorbic Acid + 2.74% AlCl$_3$6H$_2$O | 10 | 10 | 10 | 9.75 | 9.75 | 9.5 |
| Example 16b 4.0% Ascorbic Acid + 1.82% AlCl$_3$6H$_2$O | 10 | 10 | 10 | 10 | 9.75 | 9.25 |
| Example 16c 4.0% Ascorbic Acid + 3.43% AlNH$_4$(SO$_4$)$_2$12H$_2$O | 10 | 10 | 10 | 9 | 8 | 8 |
| Untreated Control | 5 | 4 | 3 | 3 | 3 | 3 |

What is claimed is:

1. A method for preserving fresh produce comprising the following steps:
    a. providing a produce preservative solution comprising:
        (i) a preservative cation selected from the group consisting of: lithium ions, copper ions, ammonium ions, manganese ions, and mixtures thereof;
        (ii) a preservative anion selected from the group consisting of: ascorbate ions, erythrobate ions and combinations thereof; and
        (iii) water;
    wherein the source of the preservative cation is at least one of hydroxide, chloride, carbonate, phosphate, glycerophosphate, lactate, and sulfate;
    wherein the source of the preservative anion is ascorbic acid, erythrobic acid or combinations thereof;
    wherein the preservative anion and preservative cation are present in an ion ratio of from 0.2:1 to 8:1; and
    b. applying said produce preservative solution to the produce.

2. The method of claim 1, wherein the preservative solution has less than 1% sodium ions and less than 1% potassium ions.

3. The method of claim 1, wherein the preservative solution preservative solution has less than 0.5% of citric acid, or citrate ions, and less than 0.5% malic acid and malate ions.

4. The method of claims 1, 2, or 3, wherein the preservative cation is the manganese ion and the preservative anion and manganese ion are present in a mole ratio of from 0.75:1 to 8:1.

5. The method of claims 1, 2, or 3, wherein the preservative cation is copper ion, and preservative anion and copper ion are present in a mole ratio of from 0.75:1 to 8:1.

6. The method of claims 1, 2, or 3, wherein the cation is ammonium ion, and the preservative anion and preservative cation are present in a mole ratio of from 0.75:1 to 8:1.

7. The method of claims 1, 2, or 3, wherein the cation is lithium ion, and the preservative anion and preservative cation are present in a mole ratio of from 0.75:1 to 8:1.

8. The method of claims 1, 2, or 3, wherein the preservative solution comprises: from 0.1% to 30% of the preservative cation; and from 0.1% to 40% of the preservative anion; wherein the preservative anion and preservative cation are present in a mole ratio of from 1:1 to 4:1.

9. The method of claims 1, 2, or 3, wherein the preservative has less than 5% of film forming agents, lactic acid and cysteine.

10. The method of claims 1, 2, or 3, wherein the preservative solution comprises: from 0.1% to 10% preservative cation, from 0.5% to 15% preservative anion; wherein the preservative anion and preservative cation are present in a mole ratio of from 1.5:1 to 3:1 and the produce is a member of the Solcanaceae family, the Amaryllidaceae family, the Brassicaceae family, the Cucurbitaceae family, the Ascomycetes/Basidiomycetes classes or the tree fruits.

11. The method of claims 1, 2, or 3, wherein: the preservative solution comprises from 0.2% to 3% preservative cation, and from 1% to 5% preservative anion; the produce is selected from the group consisting of peppers, onion, tomatoes, cucumbers, mushrooms, celery, potatoes, lettuce, apples, pears, avocadoes and mixtures thereof; the produce is cut, and; the cut produce is not frozen, dried, cooked or canned after step b.

12. A cut fruit or vegetable preserved according to the method of claims 1, 2, or 3.

* * * * *